US012169487B1

United States Patent
Chaturvedi et al.

(10) Patent No.: US 12,169,487 B1
(45) Date of Patent: Dec. 17, 2024

(54) DIRECT COLD TIER UPSERTS AND PARTITION SPLITS ENABLING CONCURRENT STREAMING DATA INGESTION FOR TIME SERIES DATABASES

(71) Applicant: Amazon Technologies, Inc., Seattle, WA (US)

(72) Inventors: Kanishka Chaturvedi, Seattle, WA (US); Timothy A. Rath, Olympia, WA (US); Rolf Petter Skog, Seattle, WA (US); Zhihao Li, Bothell, WA (US); Zhong Ren, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 76 days.

(21) Appl. No.: 17/548,293

(22) Filed: Dec. 10, 2021

Related U.S. Application Data

(60) Provisional application No. 63/283,369, filed on Nov. 26, 2021.

(51) Int. Cl.
  *G06F 16/23* (2019.01)
  *G06F 7/14* (2006.01)
  *G06F 16/22* (2019.01)

(52) U.S. Cl.
  CPC ............ *G06F 16/2379* (2019.01); *G06F 7/14* (2013.01); *G06F 16/221* (2019.01); *G06F 16/2365* (2019.01)

(58) Field of Classification Search
  CPC .............. G06F 16/2379; G06F 16/221; G06F 16/2365; G06F 7/14
  See application file for complete search history.

(56) References Cited

U.S. PATENT DOCUMENTS

| | | | |
|---|---|---|---|
| 10,997,137 B1* | 5/2021 | Goyal | G06F 16/24573 |
| 11,068,537 B1* | 7/2021 | Goyal | G06F 16/278 |
| 2011/0016157 A1* | 1/2011 | Bear | G06F 16/22 |
| | | | 707/804 |
| 2012/0166749 A1* | 6/2012 | Eleftheriou | G06F 3/0616 |
| | | | 711/E12.002 |
| 2015/0095307 A1* | 4/2015 | Bensberg | G06F 16/185 |
| | | | 707/769 |
| 2015/0106556 A1* | 4/2015 | Yu | G06F 12/0246 |
| | | | 711/103 |
| 2016/0125021 A1* | 5/2016 | Birka | G06F 16/23 |
| | | | 707/692 |
| 2017/0371667 A1* | 12/2017 | Fei | G06F 9/30112 |
| 2020/0004449 A1* | 1/2020 | Rath | G06F 9/5061 |
| 2020/0175018 A1* | 6/2020 | Kommera | G06F 9/546 |

(Continued)

*Primary Examiner* — Jensen Hu
(74) *Attorney, Agent, or Firm* — Nicholson DeVos Webster & Elliott LLP

(57) ABSTRACT

Techniques for performing a scratch space flush of cold tier upsert data into cold tier storage while allowing continued hot tier ingestion are described. Data points to be written into a time series database having a hot tier and a cold tier may be designated to be written directly into the cold tier, bypassing the hot tier that typically stores new data points that eventually are aged out into the cold tier. New data points for insertion directly into the cold tier may be stored to a scratch space storage and moved into the cold tier according to a non-blocking protocol that allows for continued hot tier ingestion without significant service disruptions.

20 Claims, 10 Drawing Sheets

(56) References Cited

U.S. PATENT DOCUMENTS

| | | | |
|---|---|---|---|
| 2020/0210080 A1* | 7/2020 | Palmer | G06F 3/061 |
| 2020/0341889 A1* | 10/2020 | Idreos | G06F 16/1734 |
| 2021/0349823 A1* | 11/2021 | Karm | G06F 12/0842 |
| 2021/0357297 A1* | 11/2021 | Kochar | G06F 11/1469 |

* cited by examiner

DIRECT COLD TIER UPSERTS AND PARTITION SPLITS ENABLING CONCURRENT STREAMING DATA INGESTION FOR TIME SERIES DATABASES

CROSS-REFERENCE TO RELATED APPLICATIONS

This application claims the benefit of U.S. Provisional Application No. 63/283,369, filed Nov. 26, 2021, which is hereby incorporated by reference.

BACKGROUND

Time series data is a sequence of data points recorded over a time interval for measuring events that change over time. Examples are stock prices over time, temperature measurements over time, and the CPU utilization of a virtual machine over time. With time-series data, a data point may be made up of a timestamp, one or more attributes, and the event that changes over time. This data can be used to derive insights into the performance and health of an application, detect anomalies, and identify optimization opportunities. For example, DevOps engineers might want to view data that measures changes in infrastructure performance metrics, manufacturers might want to track IoT sensor data that measures changes in equipment across a facility, and online marketers might want to analyze clickstream data that captures how a user navigates a website over time. Time series data can be generated from multiple sources in extremely high volumes, needs to be cost-effectively collected in near real time, and requires efficient storage that helps organize and analyze the data.

BRIEF DESCRIPTION OF DRAWINGS

Various embodiments in accordance with the present disclosure will be described with reference to the drawings, in which.

DETAILED DESCRIPTION

The present disclosure relates to methods, apparatus, systems, and non-transitory computer-readable storage media for cold tier upserts and/or cold tier partition splits with concurrent streaming data ingestion for time series databases. According to some embodiments, data points for a time series database can be directly merged into a cold tier of the time series database, which typically includes data points that have "aged out" of a hot tier of the time series database, without needing to significantly impact the continued ingestion of data points into the hot tier via use of a flush protocol. In some embodiments, the flush protocol may also be used to split database partitions in a similar manner that avoids significant disruptions that would impact the ingestion of data points into and/or querying of the database.

Figure 1:
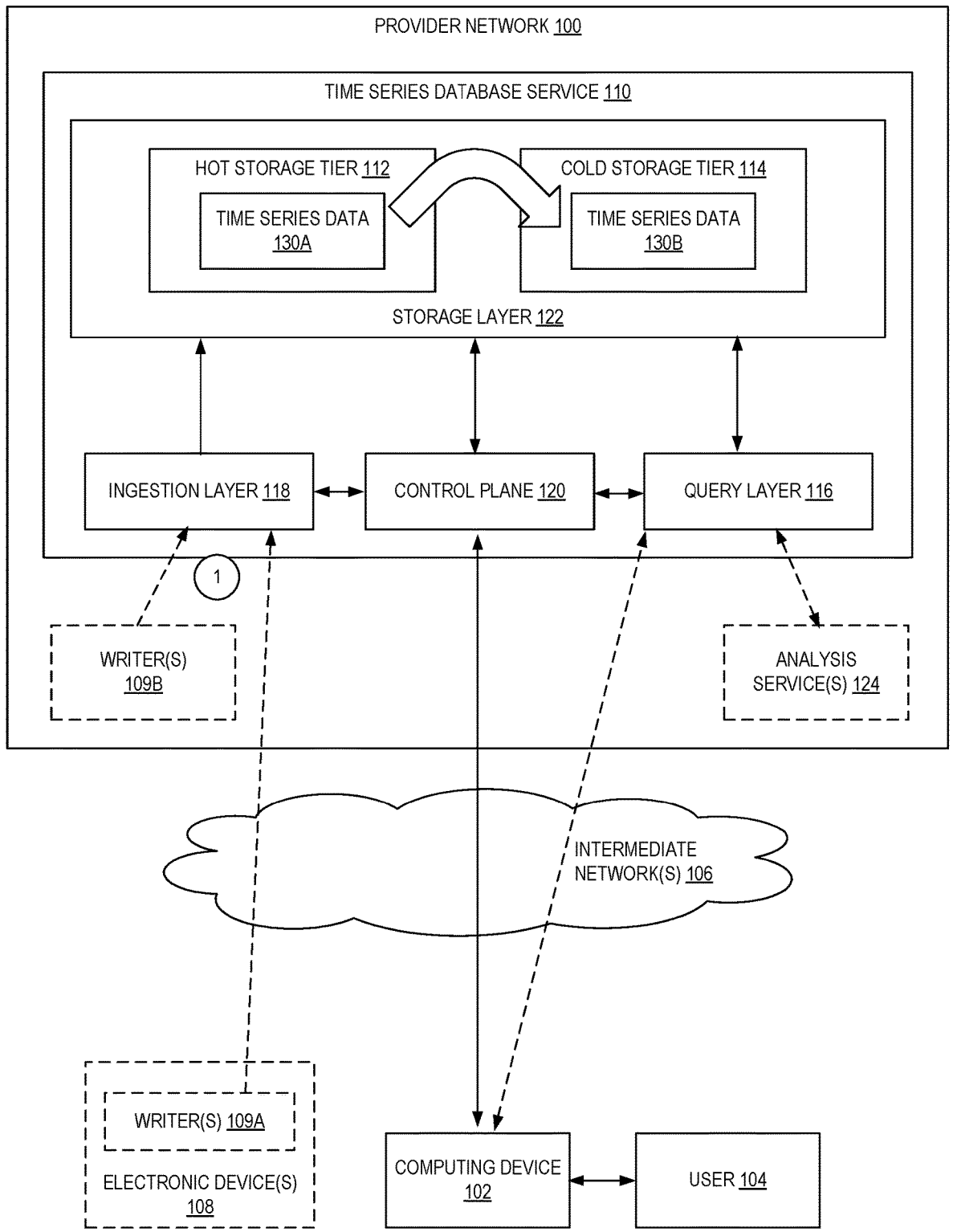
FIG. 1 is a diagram illustrating an environment including a time series database service implemented in a multi-tenant cloud provider network according to some embodiments.

FIG. 1 is a diagram illustrating an environment including a time series database service implemented in a multi-tenant cloud provider network according to some embodiments. In FIG. 1, a time series database service 110 is illustrated as being implemented within a multi-tenant cloud provider network 100. A provider network 100 (or, "cloud" provider network) provides users with the ability to use one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources can be provided as services, such as a hardware virtualization service that can execute compute instances, a storage service that can store data objects, etc. The users (or "customers") of provider networks 100 can use one or more user accounts that are associated with a customer account, though these terms can be used somewhat interchangeably depending upon the context of use. Users can interact with a provider network 100 across one or more intermediate networks 106 (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) can be part of, or serve as a front-end to, a control plane of the provider network 100 that includes "backend" services supporting and enabling the services that can be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Users can connect to an AZ of the cloud provider network via a publicly accessible network 106 (e.g., the Internet, a cellular communication network), e.g., by way of a transit center (TC). TCs are the primary backbone locations linking users to the cloud provider network and can be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network can deliver content from points of presence (or "POPs") outside of, but networked with, these regions by way of edge locations and regional edge cache servers. This compartmentalization and geographic distribution of computing hardware enables the cloud provider network to provide low-latency resource access to users on a global scale with a high degree of fault tolerance and stability.

Generally, the traffic and operations of a provider network can broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes user resources that are implemented on the provider network (e.g., computing instances, containers, block storage volumes, databases, file storage). Data plane traffic generally includes non-administrative operations, such as transferring user data to and from the user resources. The control plane components are typically implemented on a separate set of servers from the data plane servers, and control plane traffic and data plane traffic can be sent over separate/distinct networks.

To provide these and other computing resource services, provider networks 100 often rely upon virtualization techniques. For example, virtualization technologies can provide users the ability to control or use compute resources (e.g., a "compute instance," such as a VM using a guest operating system (O/S) that operates using a hypervisor that might or might not further operate on top of an underlying host O/S, a container that might or might not operate in a VM, a compute instance that can execute on "bare metal" hardware without an underlying hypervisor), where one or multiple compute resources can be implemented using a single electronic device. Thus, a user can directly use a compute resource (e.g., provided by a hardware virtualization service) hosted by the provider network to perform a variety of computing tasks. Additionally, or alternatively, a user can indirectly use a compute resource by submitting code to be executed by the provider network (e.g., via an on-demand code execution service), which in turn uses one or more compute resources to execute the code-typically without the user having any control of or knowledge of the underlying compute instance(s) involved.

The time series database service 110 may be a fast, scalable, serverless time series database service (e.g., for use with Internet-of-Things and/or operational applications) that makes it easy to store and analyze potentially trillions of events per day up at speeds many times faster than that of modern relational databases. The time series database service 110 can help users by managing the lifecycle of time series data by keeping recent data in memory and moving historical data to a cost optimized storage tier based upon user defined policies. The time series database service 110 may implement an adaptive query engine that allows users to access and analyze recent and historical data together, without having to specify its location. The time series database service 110 may implement and make accessible built-in time series analytics functions, helping users identify trends and patterns in data in near real-time. The time series database service 110, in some embodiments, is "serverless" and can automatically scale up or down to adjust capacity and performance, so users do not need to manage the underlying infrastructure. An example of a time series database service 110 is Amazon (R) Timestream (TM).

The time series database service 110 may store time series data, where a time series is a sequence of one or more data points (or records) pertaining to a time interval. Examples are the price of a stock over time, the CPU or memory utilization of a compute instance over time, the temperature/pressure reading of an IoT sensor over time, etc. A record may refer to a single data point in a time series, and a dimension may refer to an attribute that describes the metadata of a time series, where a dimension may include a dimension name and a dimension value. For example, when considering a stock exchange as a dimension, the dimension name could be "stock exchange" and the dimension value could be "NYSE," while for an IoT sensor, the dimension name could be "device ID" and the dimension value could be "12345."

A measure may be an actual value being measured by the record. Examples are the stock price, the CPU or memory utilization, and the temperature or humidity reading. Measures include measure names and measure values, e.g., for a stock price, the measure name could be "stock price" and the measure value is the actual stock price at a point in time, whereas for CPU utilization, the measure name could be "CPU utilization" while the measure value is the actual CPU utilization (e.g., 40% or 0.40). A timestamp may indicate a time when a measure was collected for a given record, e.g., with up to nanosecond granularity. A table may refer to a container for a set of related time series, while a database is a top-level container for tables.

Thus, a database may include zero or more tables, where each table includes zero or more time series. Each time series may include a sequence of records over a given time interval at a specified granularity. Each time series can be described using its metadata or dimensions, its data or measures, and its timestamps.

In some embodiments, the time series database service 110 is implemented to collect, store, and process time series data at scale via use of a serverless architecture that supports fully decoupled data ingestion, storage, and query processing systems (e.g., the ingestion layer 118, storage layer 122, and query layer 116 of FIG. 1) that can each scale independently. This design simplifies each sub-system, making it easier to provide unwavering reliability, eliminate scaling bottlenecks, and reduce the chances of correlated system failures. Each of these factors becomes more important as the system scales.

When time series data is sent to the time series database service 110, e.g., via use of an SDK or via direct invocation of a "write" APIs call (as shown via circle (1)), a write may first be handled by a data ingestion layer 118, before being written to a fault tolerant memory store (also referred to herein as hot storage tier 112). The data ingestion layer 118 is designed to process trillions of events per second and scale horizontally to match the requirements of user applications. The hot storage tier 112 processes incoming data from the ingestion layer 118, detects duplicates, and may replicate the data (e.g., across multiple availability zones of the provider network).

When data is stored in the time series database service 110, it may be automatically indexed based on its temporal and contextual attributes to ensure optimal data retrieval when queried. The time series database service 110, in some embodiments, also automates data lifecycle management by enabling users to configure table-specific data retention policies. For example, a user 104 can configure a data retention policy (via use of a computing device 102 to interact with a control plane 120 of the time series database service 110) to automatically move time series 130A data from the hot storage tier 112 (or "memory store") to a cold storage tier 114 (e.g., a "magnetic store", as time series data 130B) when it reaches a certain age.

Once the time series data moves to the cold storage tier 114, it is reorganized into a format that is optimized for large volume data reads. Like the hot storage tier 112, the cold storage tier 114 also allows for configuration of data retention policies. For example, users can configure a data retention policy to delete hot storage tier 112 as it reaches a certain age threshold, or store data in the cold storage tier 114 for up to two-hundred years.

In some embodiments, the time series database service 110 simplifies data access through a purpose-built adaptive query engine (of the query layer 116). The query engine can seamlessly access and combine data across the storage tiers (of the storage layer 122) without having to specify the location of the data. This allows users to derive insights quickly and easily from data, e.g., using SQL queries.

Queries, in some embodiments, can be executed by a dedicated fleet of worker nodes of the query layer 116 (independent of the ingestion and storage layer nodes), where the number of workers enlisted to run a given query can be determined by query complexity and data size. Through massive parallelism on both the query execution fleet and the storage fleets of the system, complex queries over large datasets are highly performant.

As indicated herein, users can collect time series data from various writers 109A-109B such as connected devices, IT systems, industrial equipment, etc., and write it into the time series database service 110. The time series database service 110 enables these writers 109 to write data points from a single time series and/or data points from many series in a single write request when the time series belong to the same table. In some embodiments, for added convenience, the time series database service 110 allows users to use a flexible schema that auto detects the column names and data types for the involved tables based on the dimension names and the data types of the measure values specified when invoking writes into the database. In some embodiments, users can also write batches of data into the time series database service 110.

The "write" operation supported by the time series database service 110 enables users to insert and "upsert" data. By default, in some embodiments, writes in the time series database service 110 follow the "first writer wins" semantics, where data is stored as append only and duplicate records are rejected. While the first writer wins semantics satisfies the requirements of many time series applications, there are scenarios where applications need to update existing records in an idempotent manner and/or write data with the last writer wins semantics, where the record with the highest version is stored in the service. To address these scenarios, the time series database service 110 provides the ability to upsert data. Upsert is an operation that inserts a record into the system when the record does not exist, or updates the record when one exists. When the record is updated, it is updated in an idempotent manner.

In some embodiments, the time series database service 110 stores and organizes time series data to optimize query processing time and to reduce storage costs. As indicated herein, embodiments offer data storage tiering and support two storage tiers: a hot tier store and a cold tier store. When data is first written to the time series database service 110, it arrives in the hot storage tier, which detects duplicate data values, sorts data, and durably stores the data. The hot storage tier also enables users to run fast point-in-time queries. The hot storage tier is typically used to store the most recent data. On the other hand, the cold storage tier is designed for storing historical data, enabling users to run analytic queries based on the volume of data being queried.

For example, in some embodiments the time series database service 110 organizes and stores time series data using is timestamp and it organizes data across time based on its dimensional attributes. As indicated herein, the time series database service 110 may support a hot storage tier 112 (e.g., with data stored in memory) for accepting and processing the incoming time series data and a cold storage tier 114 (e.g., backed by magnetic disk, SSD, etc.) for historical data. The hot storage tier 112 in some embodiments is a write-optimized store that accepts and deduplicates incoming time series data, accepts and processes late arriving data from devices and applications with intermittent connectivity, and/or is optimized for latency sensitive point-in-time queries. The cold storage tier 114, however, is a read-optimized store that contains historical data and is also optimized for fast analytical queries that scan hundreds of terabytes of data, e.g., via use of different data storage representations, such as storing data in columnar-based formats (e.g., the Apache Parquet columnar storage format).

The time series database service 110, in some embodiments, ensures durability of the time series data by automatically replicating the hot and cold storage tier data across different availability zones within a single region. In some embodiments, all of the user data is written to disk before acknowledging a write request as complete.

In some embodiments, the time series database service 110 enables users to configure retention policies to move data from the hot storage tier to the cold storage tier. When the data reaches the configured value, the time series database service 110 automatically moves the data to the cold storage tier 114. Users can also set a retention value on the cold storage tier 114. When data expires out of the cold storage tier 114, it is permanently deleted, moved outside of the system to a user-configured location, etc.

For example, consider a scenario where a user configures the hot storage tier to hold a week's worth of data and the cold storage tier to hold one year's-worth of data. The age of the data is computed using the timestamp associated with the data point. When the data in the hot storage tier becomes a week old, it is automatically moved to the cold storage tier. It is then retained in the cold storage tier for a year. When the data becomes a year old, it is deleted, moved out of the system, etc. The retention values of the hot and cold storage tiers cumulatively define the amount of time the user data will be stored in the time series database service 110. This means that for the above scenario, from the time of data arrival, the data is stored in the time series database service 110 for a total period of one year and one week.

With the time series database service 110, users can easily store and analyze metrics for a variety of purposes, such as DevOps, sensor data for IoT applications, industrial telemetry data for equipment maintenance, as well as many other use cases. In some embodiments, the time series database service 110 utilizes a purpose-built, adaptive query engine that allows users to access data across storage tiers using a single SQL statement, e.g., by transparently accessing and combining data across storage tiers without requiring users to specify the data location. Users can use SQL to query data in the time series database service 110 to retrieve time series data from one or more tables, and/or users can access the metadata information for databases and tables. The time series database service 110 may support a version of SQL that includes built-in functions for time series analytics. Users may also analyze or otherwise make use of the data via other analysis services 124, such as analytics services, business application services, machine learning services, hardware virtualization services, or the like.

As indicated herein, users can access the time series database service 110 using one or more of a variety of mechanisms, such as a web-based console application, a command-line interface, via an API, etc., to create/edit/delete a database, create/edit/delete a table in a database, run queries, etc. For example, to create a database, a user may issue a command (via sending a request message through use of a computing device 102 to the control plane 120) to create a table, which may include data such as the name of the database the table should be part of, a name for the table, a hot storage tier retention period amount of time (specifying how long to retain data therein), a cold storage tier retention period amount of time (specifying how long to retain data therein), etc.

Figure 2:
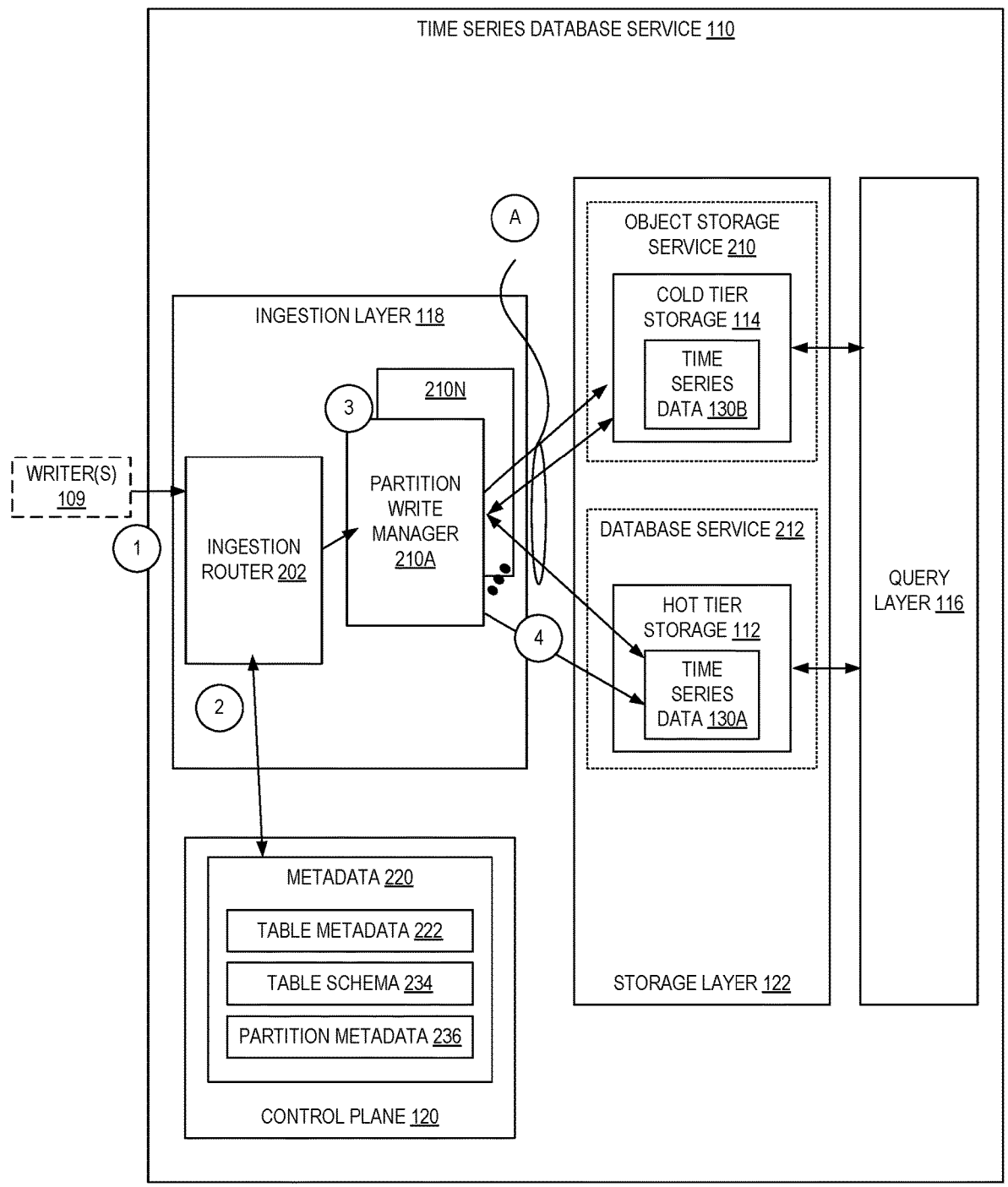
FIG. 2 is a diagram illustrating an environment including a time series database service with a hot storage tier and a cold storage tier according to some embodiments.

For further detail, FIG. 2 is a diagram illustrating an environment including a time series database service with a hot storage tier and a cold storage tier according to some embodiments. As illustrated, in some scenarios a writer 109 may send time series data to be written to a database, which is received at an ingestion layer 118 of the time series database service 110 at circle (1). An ingestion router 202 may authenticate the request using techniques known to those of skill in the art and may further analyze the request to determine where to write the data to—e.g., which partition of which database it involves. For example, the provided data point(s) may belong to a particular partition of the data of a particular table of a particular database, e.g., the table may be partitioned according to time or some other dimension (e.g., location, type of data point, etc.). Thus, the ingestion router 202 may determine which partition the data points involve, which may include accessing a metadata 220 store (e.g., table metadata 222 describing various tables, table schemas 234 providing the inferred or declared or observed schemas of various tables, or partition metadata 236 describing particular partitions (as used herein, a "partition object" may also be used to generally refer to a representation associated with one partition, or multiple partitions). This metadata 220 store may be cached at the ingestion router 202, accessed from a separate location (e.g., a database of the control plane 120) by the ingestion router 202 itself or by another service/component that the ingestion router 202 can interact with/query for this data.

Thus, as a result the ingestion router 202 can identify a partition write manager 210A associated with the particular partition that the data points belong to, and the data is routed to that partition write manager 210A at circle (3), which may be implemented as a "node" using software executed by a compute instance. The partition write manager 210A may then write the data point(s) to the time series data 130A of hot tier storage 112 at circle (4). Periodically, or based on a condition being satisfied, data may "age out" of the hot tier (or due to the partition hitting a boundary, i.e., having too many data points, or having data points falling outside of a partition key range associated with that partition), at circle (A) the partition write manager 210A may read from the hot storage tier 112, generate a particular representation of the data (e.g., in a columnar format, etc.) that is to be moved to the cold tier 114 (possibly along with time series data 130B already existing in the cold tier that is to remain in the cold tier), and persist the result to the cold storage tier 114.

Thus, data can be ingested into the hot tier storage 112, which is optimized for writes, and moved to the cold tier storage 114 after a period of time, which is optimized for reads, and all of this data can be simply queried/analyzed by users by way of the query layer 116, which abstracts away the complexities related to where, exactly, the necessary underlying data exists-whether in the hot tier or cold tier.

However, a problem exists with this configuration as users may need to "fix" or otherwise correct certain existing data points that may be in the cold tier of their database or add in a historic backfill of data points into their database. However, there is no easy way of doing this, as a user would have to first write into the hot tier storage 112, wait for the first hot tier retention period to expire, and then the updates would be visible in the cold tier, and this time delay (of hours, days, weeks, months, or more) may not be fast enough for their need. Further, a naive attempt to simply add data points directly into the cold tier storage 114 is not sufficient, as due to typically using storage for cold tiers on comparatively "slower" storage devices (e.g., magnetic media, SSDs, etc.) these data points may need to be stored in a format that is heavily optimized for reading/querying, but not optimized for writing, such as the Apache Parquet column-based format. It is known that updating a data store in such formats is a resource intensive process, requiring a significant amount of time that may be extremely detrimental to the performance of the overall system, in terms of needing to make the service unavailable for a period of time or significantly degrading its performance. Similarly, performing "upsert" type insertions into the data also requires a large amount of work, as the entire (typically large) dataset may need to be downloaded, rearranged, scanned multiple times for the purpose of determining whether an existing record exists and/or whether an existing record's version number is higher or lower than that of a new data point, etc.

Accordingly, techniques described herein allow for direct writes into a cold tier, and/or for efficient partition splits, while continuing to allow ingestion of hot tier data in an uninterrupted, unaffected manner.

Figure 3:
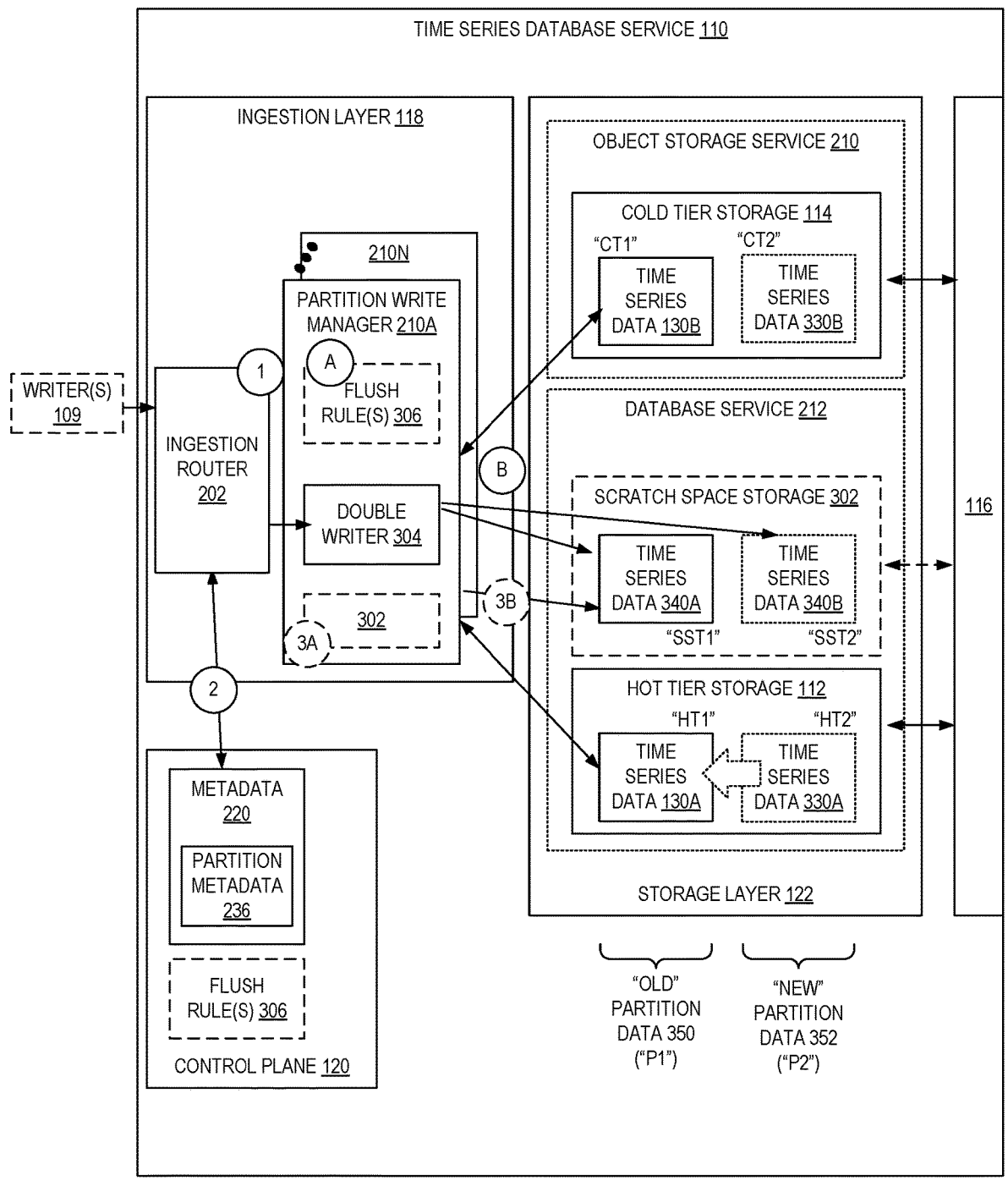
FIG. 3 is a diagram illustrating a high-level view of a time series database service providing cold tier direct writes via partition splits with concurrent streaming data ingestion according to some embodiments.

FIG. 3 is a diagram illustrating a high-level view of a time series database service providing cold tier direct writes via partition splits with concurrent streaming data ingestion according to some embodiments. As described herein, a partition object may refer to an abstraction of one or more partitions, where a partition object can have the data points of the partition present in the hot tier or cold tier. In embodiments disclosed herein, a partition object may further utilize a scratch space storage 302 area (or scratch space tier ("SST")) that can act as a buffer where user data points are accepted and stored that are ultimately destined to the cold tier. In some embodiments, the scratch space storage 302 is a "private" data store that is not directly queryable by users (e.g., via the query layer 116), unlike the hot or cold tiers, and this store can be used to "stage" the data points to be written to the cold tier storage 114 without affecting the other operations of the database. However, in some embodiments, the time series data 340 stored in scratch space storage 302 may be accessed by the query layer 116 (along with data in cold tier storage 114 and/or hot tier storage 112 as described herein) to obtain its data to allow users to have a near-immediate updated view of their data. For example, the query layer 116 may execute a query originated by a client by running the query (or statements generated based on the query) separately against the data from the hot tier, cold tier, and scratch space storage, and perform a merge process to generate an ultimate query result to be provided to the calling client.

For example, upon receiving a request to write one or more data points directly to the cold tier (e.g., where the request includes a method name or argument identifying the cold tier as the targeted destination) at circle (1), the ingestion router 202 may again perform a lookup (or interact with another service/component that does a lookup, such as via circle (2)) to identify a partition associated with the data points, e.g., to identify a particular partition write manager 210A responsible for writing the data point(s). In some embodiments, this process can also include determining whether the partition write manager 210A already has (or, has access to) a scratch space storage 302 for its use, and if not, creating one (e.g., launching a lightweight database instance, creating a storage location, etc.).

Thus, the partition write manager 210A may obtain the data point(s), determine that they are to be written to cold tier storage 114 (e.g., via the called method, arguments, etc.), and write the data point(s) as time series data 340A into the scratch space storage 302 at circle (3A) or (3B), where the scratch space storage 302 may be located local to the partition write manager 210A (e.g., as a data store, data structure, database, etc., that is accessible to the partition write manager 210A on a same computing device) or external to the partition write manager 210A, such as being a database provided by a separate database service of the provider network.

The data point(s), and potentially other data points to be written to cold tier storage 114, may wait in the scratch space storage 302 until it is time for a "flush," where the time series data 340A data points in the scratch space storage 302 are actually added to the cold tier storage 114. Given the high relative resource cost to perform such updates/modifications to the cold tier storage 114, as described herein, embodiments may trigger a flush according to a particular conditional rule being satisfied instead of after each addition of a set of data points to the scratch space storage 302, which would be tremendously inefficient—e.g., if a single data point is added by the writer 109 every few seconds or minutes, and the amount of data in the cold tier is very large (e.g., gigabytes or terabytes of data or more), the launching of a flush routine for every added data point would cause numerous, potentially never-ending launches to occur that could overwhelm the system, cause race conditions, and/or consume large amounts of resources.

In some embodiments, at circle (A) the partition write manager 210A may determine that a condition of a flush rule 306 is satisfied, which may include evaluating the rule(s) locally, or receiving a notification from another entity (e.g., a control plane 120 entity) that a rule condition is satisfied. A first type of flush rule 306 may be configured that is time-based, e.g., every ten minutes, one hour, two hours, day, etc., a flushing is to be invoked (provided that there are time series data 340A points in the scratch space storage 302 needing to be merged into the cold tier), or a more explicit schedule may be defined (e.g., perform a flush every day at 8 AM, 1 PM, and 6 PM). Thus, upon determining a current time satisfies a time-based flush rule 306, the partition write manager 210A may invoke a flush at circle (B).

One naive approach to invoking a flush may use a protocol in which ingestion is blocked for the database for a period of time (to ensure consistency, etc.), where the cold tier storage 114 time series data 130B is downloaded (e.g., into a queryable datastore), scratch space storage 302 time series data 340A (including the new data points) is downloaded, the content is intelligently merged together, and a new set of files/objects are generated to be placed back into cold tier storage 114. Thereafter, the ingestion into the database may then be unblocked.

Though this works, this protocol suffers in that it blocks the typical ongoing operation of the database during this process, which again, can take some time and may occur many times. As a result, the writers 109 (and thus, the users) may be directly affected in a negative, unacceptable way by experiencing occasional service outages and/or slow performance.

Accordingly, embodiments disclosed herein utilize an improved protocol where ongoing ingestion/operations of the database may continue during flushes, allowing for direct-to-cold-tier updates and/or partition splits that do not affect the user's experience.

In some embodiments, to perform a flush, a new partition object is created to represent the new, updated state of a partition, allowing for a more seamless switchover. Such an object may be a logical representation of a partition and may include metadata identifying the particular underlying data points belonging to the partition. For example, a partition object may include an identifier of (e.g., a pointer to) a particular set of hot tier storage objects/locations, an identifier of a particular scratch space storage location or objects (data points) stored therein, an identifier of a particular set of cold tier storage objects/locations, etc. In this flush protocol, a new partition object is created that is updated to ingest the data point(s) into the cold tier from the scratch space storage, and then references to the previous "old" partition may be quickly flipped to instead reference the "new" partition.

For example, in some embodiments the partition write manager 210A (or other components, under the direction of the partition write manager 210A) may perform a flush by moving from a first partition object "P1" to a second partition object "P2." Assuming the P1 begins with a cold tier storage "CT1" having n data points, and further has a scratch space storage "SST1" with a single data point to be added to CT1, the flush may include generating a new partition object P2 with a cold tier storage "CT2" (including the original n data points and the additional single data point) and optionally with a scratch space storage "SST2" including any new cold-tier-destined data points that arrived during the flush process (which can be incorporated into CT2 during a next flush, and which may have also been written to both SST1 and SST2 during this process by a double writer 304 to ensure durability in the event of failure). In some embodiments, the new partition object, P2, may simply include a hot tier storage HT2 that comprises a pointer to the existing HT1 storage, though in other embodiments a separate storage may also be generated and updated during this process. Thus, upon finishing the merge and writing the new cold tier storage data, a flip may occur for the partition from P1 to instead reference P2 for subsequent usage, and any extraneous remaining data in P1 that is no longer referenced may be deleted at some point.

As indicated above, the flush mechanism may be performed by the partition write manager 210A, but in some embodiments the partition write manager 210A may work together with other components to perform a flush, e.g., the partition write manager 210A may invoke a flush to allow other components-such as one or more worker nodes from a (non-illustrated) fleet of available worker nodes (or "data flusher nodes")—to perform the work more efficiently, as they may be executed on underlying computing hardware that is more specifically tuned/configured/provisioned for processing and/or memory intensive tasks such as those involved in merging this type of data. In some embodiments, though, the partition write manager 210A flushes the data to disk while merging to avoid creating memory hotspots; however, in embodiments using a fleet of worker nodes having a large amount of underlying memory available, the involved work may potentially be performed completely in memory, allowing the process to be completed much faster. Further, the fleet can be scaled (e.g., to add more resources to individual fleet members, and/or to increase the number of worker nodes in the fleet involved) to provide further performance improvements.

For example, an exemplary outline of a protocol is as follows:

---
Protocol (move from P1 to P2, merging data points in scratch space "SST1"):

Create partition object "P2", including a scratch space "SST2"
Start download of cold tier "CT1" data and ingest into a queryable datastore
Block ingestion for short period:
Generate a snapshot of scratch space SST1 (e.g., an MVCC snapshot)
Configure "double writing" of cold tier writes to old and new scratch spaces SST1 and SST2, for durability
Unblock ingestion
Start download of SST1 data, corresponding to the snapshot, and ingest into queryable datastore
Optional:
Using queryable datastore, validate partition split point, record updated split point(s) if found and/or initiate different split
Using queryable datastore, determine if further split is needed. If so, enqueue or initiate a partition split
Generate new CT2 file(s) using queryable database, upload to cold tier storage
Block ingestion for short period:
Commit the flush by updating metadata references from P1 to P2
Stop the double writing
Unblock ingestion
---

During the above protocol, or after the protocol, a cleanup process may include the following:

---
Cleanup for P1:
Delete old CT1 data file(s)/objects
Delete/terminate SST1
---

Figure 4:
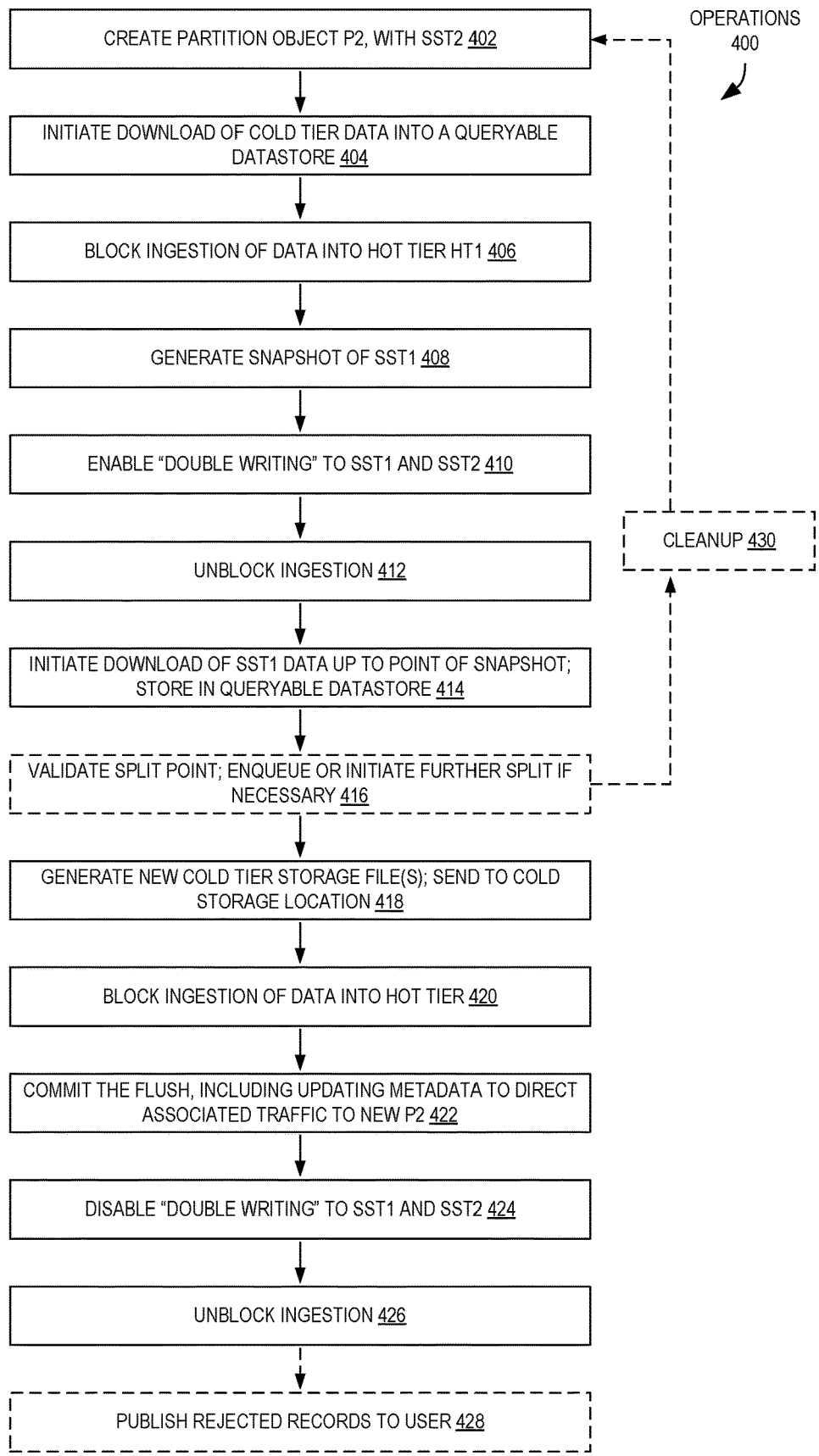
FIG. 4 is a flow diagram illustrating operations of a method for performing a scratch space flush of cold tier upsert data into cold tier storage while allowing continuing hot tier ingestion according to some embodiments.

As another example of the protocol, FIG. 4 is a flow diagram illustrating operations of a method for performing a scratch space flush of cold tier upsert data into cold tier storage while allowing continuing hot tier ingestion according to some embodiments. Some or all of the operations 400 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some embodiments, one or more (or all) of the operations 400 are performed by the time series database service 110 of the other figures.

The operations 400 include, at block 402, creating a new partition object ("P2"), along with a scratch space location ("SST2"). The new partition object may include metadata including a pointer to a cold tier storage location (which may be empty), a pointer to a scratch space object (e.g., a particular database table or storage location), and/or a pointer to a hot tier storage location (e.g., a particular memory store, which may be the same as the memory store of the initial P1 hot storage tier location).

At block 404, the operations 400 include initiate a download of cold tier data into a queryable datastore, e.g., where the cold tier data may be in a read-optimized format (e.g., stored in a column-oriented format), and this data is processed and inserted into a queryable datastore, such as a lightweight database, perhaps in a row-based format.

The operations 400 include, at block 406, blocking ingestion of data into the hot tier of the P1. During the blocking of the ingestion, at block 408, the operations 400 include generating a snapshot of SST1 (the scratch space location of P1), e.g., a lightweight Multiversion concurrency control (MVCC) view of a table/database, and at block 410, enabling a "double writing" of newly-arriving data points to be written into the cold tier into both the P1 SST1 as well as the new P2 SST2, which provides increased durability in the event of a failure. At block 412, the operations 400 include unblocking the ingestion, allowing regular database ingestion to continue.

At block 414, the operations 400 include initiating a download of the SST1 data up to the point of the snapshot, to thus include all the "new" data points to be merged. This data can be stored in a queryable database (which may be the same as the queryable database of block 404, possibly in one or more of the same tables/collections) for ease of further processing.

Optionally, the operations 400 include, at block 416, validating a split point, in the case where a partition is being split into two new partition at a particular point. As the full content of the cold tier data is now easily accessible and can be queried to fully examine the data and generate detailed statistics, a more optimal split point can be generated (e.g., that splits the data points more equally into more equally-sized partitions) that may not have been able to be determined before, when only some rough statistics about the actual data in the cold tier may exist, or when a very limited amount of data in the scratch space could be examined that likely is not representative of the entire dataset. In the event of a different split point being identified, a different split process can be initiated (or enqueued), and optionally the current flush/split may be terminated. For example, if a different split point is identified (e.g., which may be substantially better than the initial split point), in some embodiments the current flush may be halted and the operations may continue by proceeding to block 430, where a cleanup process may be initiated (e.g., to delete or free resources used so far from blocks 402-416) and the process may start again, e.g., by continuing back to block 402 (or another block, such as when some or all of the results from blocks 402-416 may be re-used).

Thus, in some embodiments, the split point validation can address a fundamental flaw in earlier computation of the split point due to having imperfect statistics (e.g., centrally maintained or inferred statistics regarding the data points and distribution thereof may not fully account for the large amount of cold tier file data). Accordingly, in some embodiments, including split point validation within the flush process can ensure the algorithm keeps on working and generating optimized files, where otherwise it may be possible to have scenarios where the algorithm can completely fail—e.g., where a user is ingesting tiny amounts of data that in insufficient to trigger a partition split, but the system may keep on updating the cold tier storage, making it bigger on every flush iteration, to the point that it offers poor query performance or can't even be stored. Thus, in some embodiments, whereas an initial split decision may be implemented as a heuristic, the in-flush split validation mechanism may be used as a self-correcting mechanism built in the protocol itself.

At block 418, the operations 400 include generating one or more new cold tier storage file(s)/object(s), e.g., based on use of the queryable datastore. The file(s) may include, e.g., columar-formatted data such as that in the Parquet file format, which is optimized for querying. In some embodiments, as described herein, the merging of particular new data points may possibly be rejected, such as when an existing data point having a higher version value already exists, and thus the data point(s) may be rejected, such as by writing them to a particular storage location (e.g., an object store of the associated user). The operations 400 include, at block 420, blocking ingestion of data into the hot tier of the P1.

At block 422, the operations 400 include committing the flush, including updating metadata (e.g., for the partition) to reference the "new" partition object P2 in place of P1. At block 424, the operations 400 include disabling the double writing (of incoming cold-tier destined data points) into both SST1 and SST2, at block 426, unblocking ingestion. Thereafter, the database is fully functional and regular ingestion into the hot tier can continue, querying of the data (from the hot tier and/or cold tier) can continue, etc. In some embodiments, the protocol may further include a set of (non-illustrated) cleanup operations, where the previous cold tier CT1 data can be removed and/or the previous scratch space SST1 data can be removed. In some embodiments, any rejected data points may be "published" at block 428 for the associated user (e.g., owner or manager of the particular time series database), such as by writing the data points to an object storage location of the user (triggering a notification to the user based on this new object), transmitting a notification to the user (e.g., via email, SMS, via a web-based application or other application), transmitting a notification to another application or service associated with the user, etc.

Figure 5:
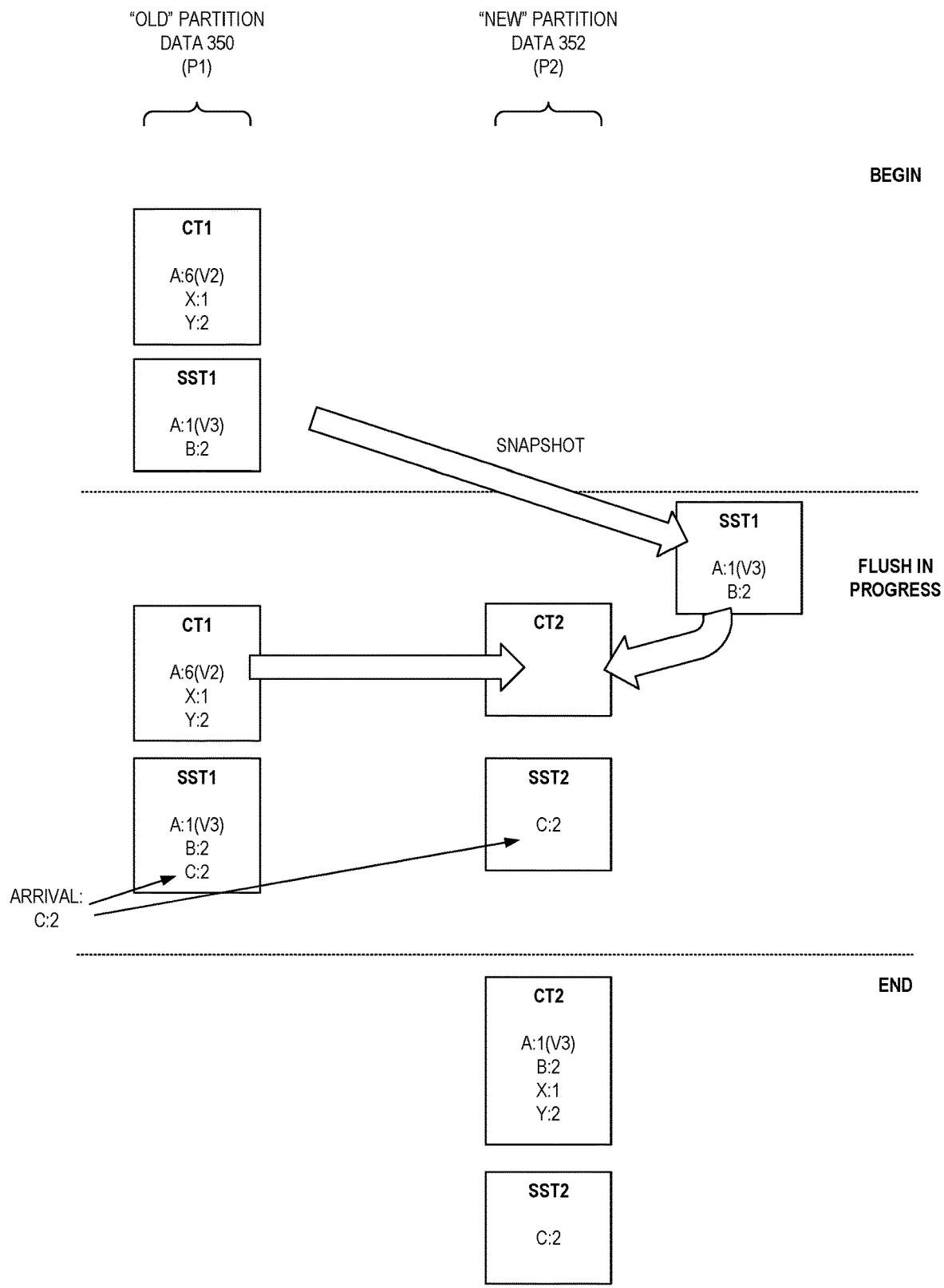
FIG. 5 is a diagram illustrating exemplary operations of a one-to-one partition split according to some embodiments.

For further understanding, FIG. 5 is a diagram illustrating exemplary operations of a one-to-one partition split according to some embodiments. In this example, prior to a flush, an existing partition may include a cold tier CT1 with three data points, A, X, and Y, where A is shown with an associated version number (V2). The existing partition may also include a scratch space SST1 with data points to be written to CT1-A (with version number V3) and B.

As described herein, the protocol may include generating a new partition object and cold tier CT2 object and taking a snapshot of SST1. The data from CT1 and the snapshot version of SST1 can be used to generate a new CT2 file. In some embodiments, these data points are added via an upsert functionality, where a data point is added if it does not exist already and may be updated if the data point does exist. In this example, the data point for A does exist, and the system is configured to only update the data point if the "new" data point (from SST1) has a larger version number associated therewith. In this case, the new data point has a V3 whereas the existing version is V2, and thus the update can occur. In the case that the version number was not greater, the update of the data point would be rejected, and the user associated with the database could be notified, the data point could be preserved in a separate storage location, etc. Notably, in some cases a new data point can be rejected at the time of insert into the scratch space, such as when a data point has a version number that is less than that of another corresponding data point already in the same scratch space. In these cases, the request the add the data point can be immediately (e.g., synchronously) rejected and indicated in a response to the request, whereas issues detectable only via analysis of cold tier data are best performed asynchronously, such as by notifying the user (e.g., via an electronic message, via a notification in an application) and/or storing the rejected data point in another storage location for later access and analysis on the part of the user.

As shown herein, during the flush process, a new data point arrives that is destined for the cold tier, here reflected by the value C=2. As described herein, this data point may be written to both SST1 as well as SST2 for the sake of durability.

After generating the updated CT2 file and persisting it in the cold tier storage (e.g., uploading it to a storage location), it is shown with four data points: the updated data point A, the new data point B, and previously existing (in CT1) data points for X and Y. At this point, the contents of SST2 may continue to include the newly arrived data point for C=2, which can be processed during a subsequent flush.

As described herein, a set of flush rules 306 can be monitored to determine when a flush is to occur. In addition to, or alternatively to, the time-based rules described herein, embodiments may include throughput and/or partition size optimization rules that can be used to determine when to perform a flush to split a partition. Thus, instead of generating a single new partition and replacing an existing partition, embodiments can split a partition with a modified protocol to split an existing partition object into two or more partition objects.

For example, a throughput rule may be configured to cause a split of a partition based on a particular amount of ingestion being detected as occurring, e.g., a number of data points being ingested in an amount of time, an amount of data (e.g., in terms of bytes) being ingested in an amount of time, etc.

As another example, a partition size optimization rule may be configured to cause a split of a partition based on a size of the underlying partition data points, e.g., a number of data points in a particular partition reaches a threshold, an amount of data in a particular partition reaches a threshold, etc. Such rules can be configured to ensure optimal query performance, as in some scenarios once a partition reaches a particular size its querying performance may degrade; thus, reducing the partition's size by creating two or more smaller partitions can improve performance.

Figure 6:
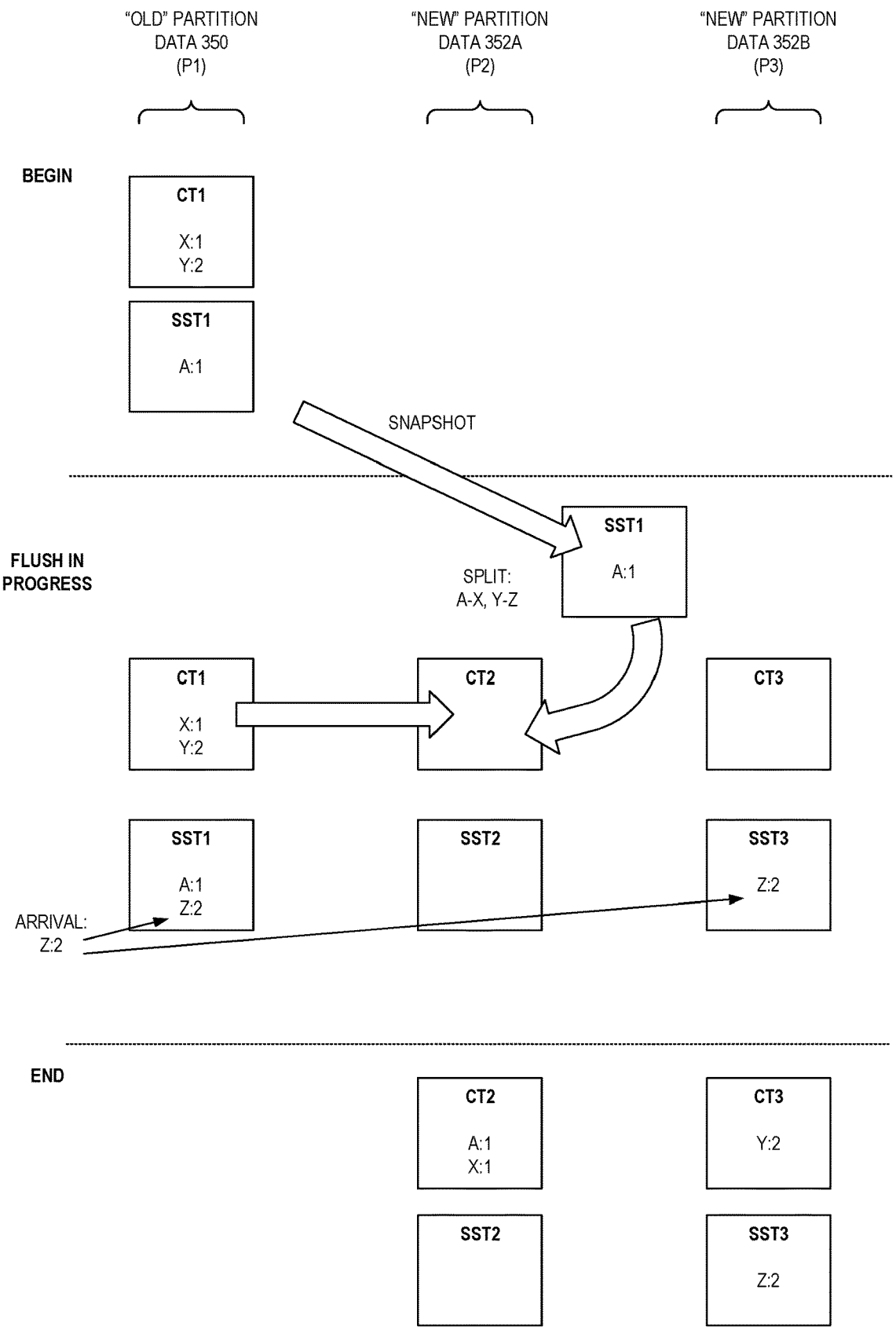
FIG. 6 is a diagram illustrating exemplary operations of a one-to-two partition split according to some embodiments.

To implement a partition split, a modified version of the protocol can be used, where generally the protocol is adapted to split the first partition into two replacement partitions, each having a subset of the data of the first partition. For example, FIG. 6 is a diagram illustrating exemplary operations of a one-to-two partition split according to some embodiments. In this example, a determination to perform a split of the partition occurs, e.g., to cause two new partitions to be created, and the double write of new cold tier data points into the original SST1 and one of the new SSTs, e.g., based on where the data point(s) fall based on the new partitioning. In this example, a new partition is determined to split data points A-X in a first new partition and data points Y-Z in a second new partition, which can be verified during the protocol. As a result, upon updating the metadata so that the previous P1 is no longer referenced but instead two partitions exist, the new partitions are created and P2's CT2 includes data points A and X, while P3's CT3 includes data point Y and its SST3 includes data point Z, which is part of the partition Y-Z.

Figure 7:
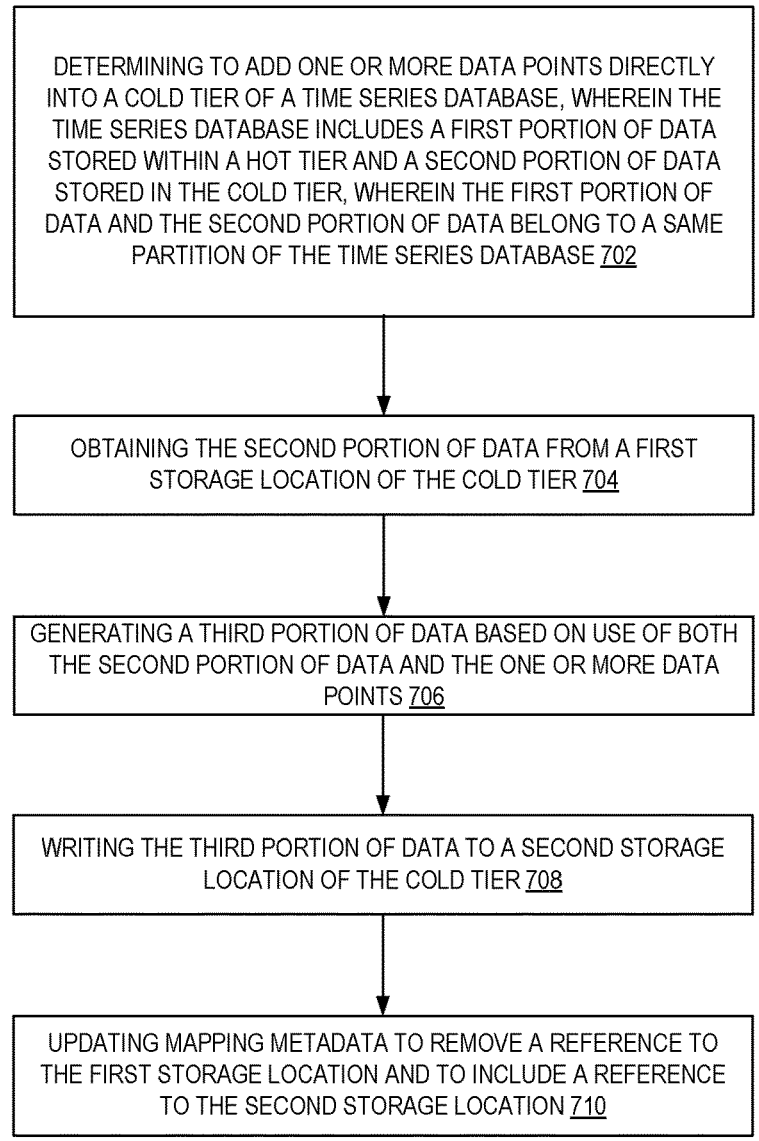
FIG. 7 is a flow diagram illustrating operations of a method for performing a scratch space flush of cold tier upsert data into cold tier storage while allowing continuing hot tier ingestion according to some embodiments.

FIG. 7 is a flow diagram illustrating operations of a method for performing a scratch space flush of cold tier upsert data into cold tier storage while allowing continuing hot tier ingestion according to some embodiments. Some or all of the operations 700 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some embodiments, one or more (or all) of the operations 700 are performed by the time series database service 110 of the other figures.

The operations 700 include, at block 702, determining to add one or more data points directly into a cold tier of a time series database, wherein the time series database includes a first portion of data stored in a hot tier and a second portion of data stored in the cold tier, wherein the first portion of data and the second portion of data belong to a same partition of the time series database. In some embodiments, the hot tier and the cold tier store data according to different formats. For example, the cold tier may utilize a column-oriented format (e.g., Apache Parquet), whereas the hot tier may utilize a row-oriented format or other format. The cold tier, in some embodiments, stores the second portion of data using files (e.g., stored in an object storage location) and/or the hot tier may utilize a database to store the first portion of data (e.g., a relational database, a key-value store, etc.). The cold tier may thus be comparatively more resource intensive (e.g., requiring more processing, time, and/or memory) to perform writes (e.g., modifications such as inserts or updates) than the hot tier, and thus the hot tier may be comparatively easier (i.e., require fewer resources) for performing writes. In some embodiments, the determining comprises determining that a threshold amount of time has passed since a prior addition of data points into the cold tier. In some embodiments, the determining comprises: determining that an amount of received data points to be added to the time series database over a recent period of time meets or exceeds a throughput threshold; or determining that a size or amount of the second portion of data stored in a persistent storage in the cold tier meets or exceeds a size threshold.

The operations 700 further include, at block 704, obtaining the second portion of data from a first storage location of the cold tier, which may include downloading the second portion of data.

The operations 700 further include, at block 706, generating a third portion of data based on use of both the second portion of data and the one or more data points.

In some embodiments, generating the third portion includes determining to reject a data point, from the one or more data points, from inclusion in the third portion based on an analysis of a version value associated with the data point and a corresponding version value associated with a corresponding data point from the second portion of data.

The operations 700 further include, at block 706, writing the third portion of data to a second storage location of the cold tier. In some embodiments, the third portion of data is written in a column-oriented format, e.g., in a Parquet format, which is query optimized.

The operations 700 further include, at block 706, updating mapping metadata (e.g., that associates a partition with its underlying storage, or a partition with a partition object that itself references its underlying storage) to remove a reference to the first storage location and to include a reference to the second storage location.

In some embodiments, the operations 700 further include prior to the determining, receiving one or more requests including the one or more data points, the one or more requests indicating that the one or more data points are to be merged directly into the cold tier. In some embodiments, the operations 700 further include inserting the one or more data points into a scratch space datastore that is not queryable by external users of the time series database service, wherein the hot tier and the cold tier are queryable by external users of the time series database service. In some embodiments, the operations 700 further include obtaining a snapshot of the scratch space datastore; and inserting an additional one or more data points into the scratch space datastore that are to be merged into the cold tier, where generating a third portion of data includes obtaining the one or more data points, but not the additional one or more data points, based on use of the snapshot. In some embodiments, the operations 700 further include waiting a period of time; and after the period of time, merging at least the additional one or more data points into the cold tier.

In some embodiments, the operations 700 further include receiving, after the determining and prior to the updating, an additional one or more data points to be merged into the cold tier; inserting the additional one or more data points into a first scratch space datastore associated with a first partition object, wherein the first partition object is associated with the partition; and inserting the additional one or more data points into a second scratch space datastore associated with a second partition object, wherein the second partition object is also associated with the partition.

In some embodiments, the operations 700 further include generating a fourth portion of data based on use of both the second portion of data and the one or more data points; writing the fourth portion of data to a third storage location of the cold tier; and updating the mapping metadata to include a reference to the third storage location, wherein the third storage location is part of a new partition.

In some embodiments, the operations 700 further include determining whether a partition split point is acceptable based at least in part on use of both the second portion of data and the one or more data points. In some embodiments, the operations 700 further include responsive to determining whether the partition split point is not acceptable, enqueuing a partition split to occur based on a split point identified during the determining.

Figure 8:
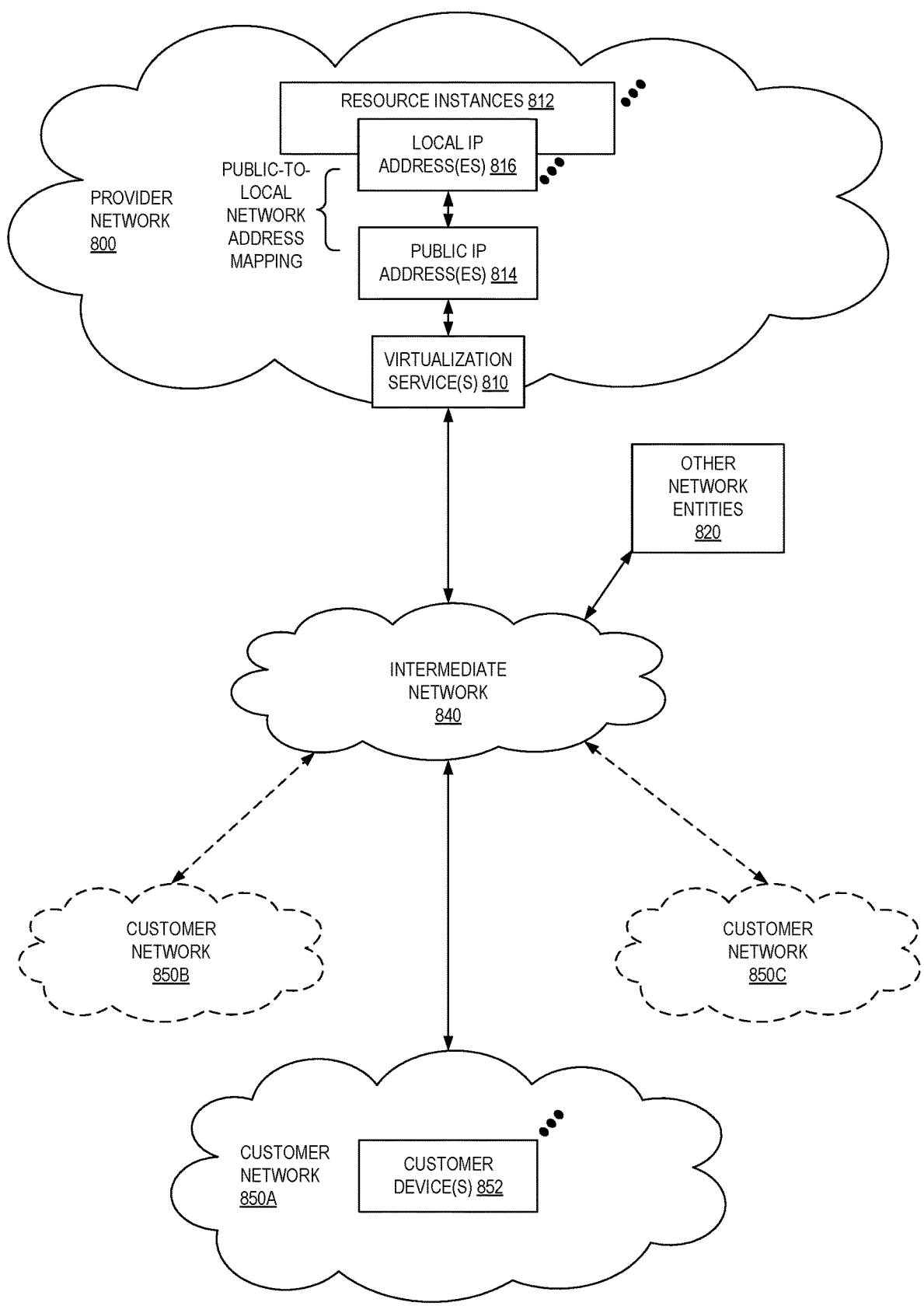
FIG. 8 illustrates an example provider network environment according to some embodiments.

FIG. 8 illustrates an example provider network (or "service provider system") environment according to some embodiments. A provider network 800 can provide resource virtualization to customers via one or more virtualization services 810 that allow customers to purchase, rent, or otherwise obtain instances 812 of virtualized resources, including but not limited to computation and storage resources, implemented on devices within the provider network or networks in one or more data centers. Local Internet Protocol (IP) addresses 816 can be associated with the resource instances 812; the local IP addresses are the internal network addresses of the resource instances 812 on the provider network 800. In some embodiments, the provider network 800 can also provide public IP addresses 814 and/or public IP address ranges (e.g., Internet Protocol version 4 (IPv4) or Internet Protocol version 6 (IPv6) addresses) that customers can obtain from the provider 800.

Conventionally, the provider network 800, via the virtualization services 810, can allow a customer of the service provider (e.g., a customer that operates one or more customer networks 850A-850C (or "client networks") including one or more customer device(s) 852) to dynamically associate at least some public IP addresses 814 assigned or allocated to the customer with particular resource instances 812 assigned to the customer. The provider network 800 can also allow the customer to remap a public IP address 814, previously mapped to one virtualized computing resource instance 812 allocated to the customer, to another virtualized computing resource instance 812 that is also allocated to the customer. Using the virtualized computing resource instances 812 and public IP addresses 814 provided by the service provider, a customer of the service provider such as the operator of the customer network(s) 850A-850C can, for example, implement customer-specific applications and present the customer's applications on an intermediate network 840, such as the Internet. Other network entities 820 on the intermediate network 840 can then generate traffic to a destination public IP address 814 published by the customer network(s) 850A-850C; the traffic is routed to the service provider data center, and at the data center is routed, via a network substrate, to the local IP address 816 of the virtualized computing resource instance 812 currently mapped to the destination public IP address 814. Similarly, response traffic from the virtualized computing resource instance 812 can be routed via the network substrate back onto the intermediate network 840 to the source entity 820.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some embodiments, the mapping of a standard IP address to a local IP address of a resource instance is the default launch configuration for all resource instance types.

At least some public IP addresses can be allocated to or obtained by customers of the provider network 800; a customer can then assign their allocated public IP addresses to particular resource instances allocated to the customer. These public IP addresses can be referred to as customer public IP addresses, or simply customer IP addresses. Instead of being assigned by the provider network 800 to resource instances as in the case of standard IP addresses, customer IP addresses can be assigned to resource instances by the customers, for example via an AP1 provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 9:
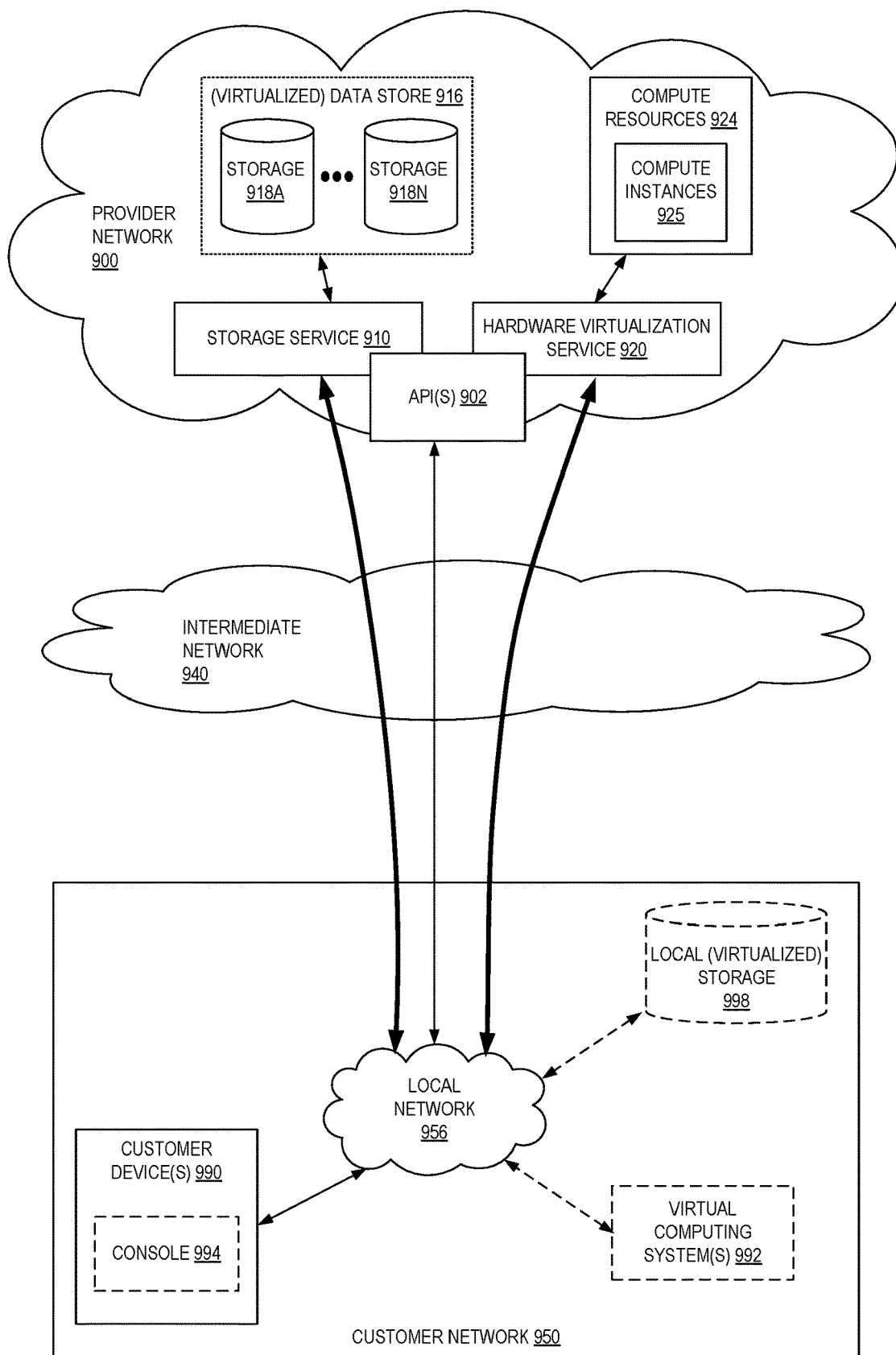
FIG. 9 is a block diagram of an example provider network that provides a storage service and a hardware virtualization service to customers according to some embodiments.

FIG. 9 is a block diagram of an example provider network environment that provides a storage service and a hardware virtualization service to customers, according to some embodiments. A hardware virtualization service 920 provides multiple compute resources 924 (e.g., compute instances 925, such as VMs) to customers. The compute resources 924 can, for example, be provided as a service to customers of a provider network 900 (e.g., to a customer that implements a customer network 950). Each computation resource 924 can be provided with one or more local IP addresses. The provider network 900 can be configured to route packets from the local IP addresses of the compute resources 924 to public Internet destinations, and from public Internet sources to the local IP addresses of the compute resources 924.

The provider network 900 can provide the customer network 950, for example coupled to an intermediate network 940 via a local network 956, the ability to implement virtual computing systems 992 via the hardware virtualization service 920 coupled to the intermediate network 940 and to the provider network 900. In some embodiments, the hardware virtualization service 920 can provide one or more APIs 902, for example a web services interface, via which the customer network 950 can access functionality provided by the hardware virtualization service 920, for example via a console 994 (e.g., a web-based application, standalone application, mobile application, etc.) of a customer device 990. In some embodiments, at the provider network 900, each virtual computing system 992 at the customer network 950 can correspond to a computation resource 924 that is leased, rented, or otherwise provided to the customer network 950.

From an instance of the virtual computing system(s) 992 and/or another customer device 990 (e.g., via console 994), the customer can access the functionality of a storage service 910, for example via the one or more APIs 902, to access data from and store data to storage resources 918A-918N of a virtual data store 916 (e.g., a folder or "bucket," a virtualized volume, a database, etc.) provided by the provider network 900. In some embodiments, a virtualized data store gateway (not shown) can be provided at the customer network 950 that can locally cache at least some data, for example frequently accessed or critical data, and that can communicate with the storage service 910 via one or more communications channels to upload new or modified data from a local cache so that the primary store of data (the virtualized data store 916) is maintained. In some embodiments, a user, via the virtual computing system 992 and/or another customer device 990, can mount and access virtual data store 916 volumes via the storage service 910 acting as a storage virtualization service, and these volumes can appear to the user as local (virtualized) storage 998.

While not shown in FIG. 9, the virtualization service(s) can also be accessed from resource instances within the provider network 900 via the API(s) 902. For example, a customer, appliance service provider, or other entity can access a virtualization service from within a respective virtual network on the provider network 900 via the API(s) 902 to request allocation of one or more resource instances within the virtual network or within another virtual network.

Illustrative Systems

Figure 10:
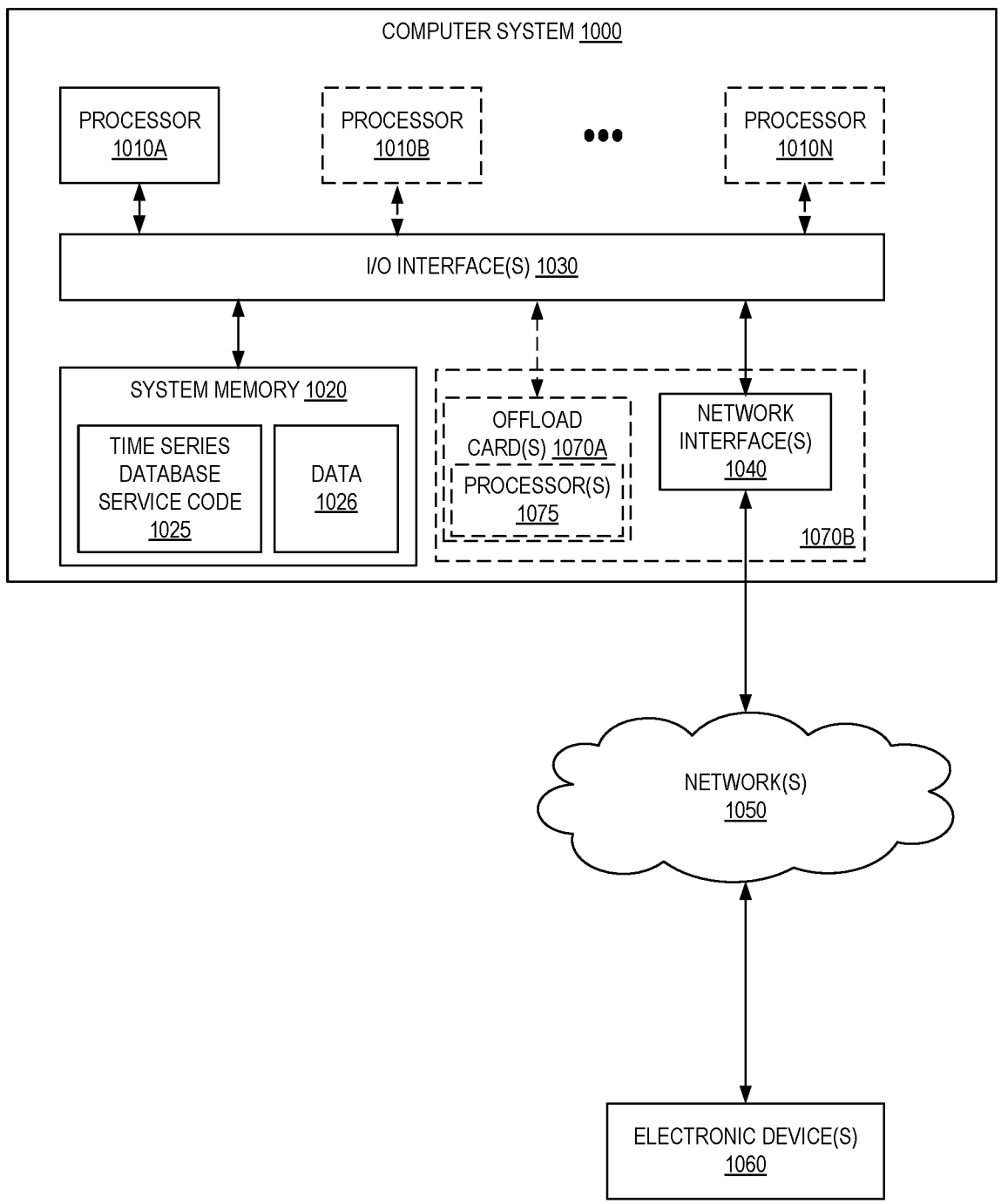
FIG. 10 is a block diagram illustrating an example computer system that can be used in some embodiments.

In some embodiments, a system that implements a portion or all of the techniques described herein can include a general-purpose computer system, such as the computer system 1000 illustrated in FIG. 10, that includes, or is configured to access, one or more computer-accessible media. In the illustrated embodiment, the computer system 1000 includes one or more processors 1010 coupled to a system memory 1020 via an input/output (I/O) interface 1030. The computer system 1000 further includes a network interface 1040 coupled to the I/O interface 1030. While FIG. 10 shows the computer system 1000 as a single computing device, in various embodiments the computer system 1000 can include one computing device or any number of computing devices configured to work together as a single computer system 1000.

In various embodiments, the computer system 1000 can be a uniprocessor system including one processor 1010, or a multiprocessor system including several processors 1010 (e.g., two, four, eight, or another suitable number). The processor(s) 1010 can be any suitable processor(s) capable of executing instructions. For example, in various embodiments, the processor(s) 1010 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 1010 can commonly, but not necessarily, implement the same ISA.

The system memory 1020 can store instructions and data accessible by the processor(s) 1010. In various embodiments, the system memory 1020 can be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within the system memory 1020 as time series database service code 1025 (e.g., executable to implement, in whole or in part, the time series database service 110) and data 1026.

In some embodiments, the I/O interface 1030 can be configured to coordinate I/O traffic between the processor 1010, the system memory 1020, and any peripheral devices in the device, including the network interface 1040 and/or other peripheral interfaces (not shown). In some embodiments, the I/O interface 1030 can perform any necessary protocol, timing, or other data transformations to convert data signals from one component (e.g., the system memory 1020) into a format suitable for use by another component (e.g., the processor 1010). In some embodiments, the I/O interface 1030 can include support for devices attached through various types of peripheral buses, such as a variant of the Peripheral Component Interconnect (PCI) bus standard or the Universal Serial Bus (USB) standard, for example. In some embodiments, the function of the I/O interface 1030 can be split into two or more separate components, such as a north bridge and a south bridge, for example. Also, in some embodiments, some or all of the functionality of the I/O interface 1030, such as an interface to the system memory 1020, can be incorporated directly into the processor 1010.

The network interface 1040 can be configured to allow data to be exchanged between the computer system 1000 and other devices 1060 attached to a network or networks

1050, such as other computer systems or devices as illustrated in FIG. 1, for example. In various embodiments, the network interface 1040 can support communication via any suitable wired or wireless general data networks, such as types of Ethernet network, for example. Additionally, the network interface 1040 can support communication via telecommunications/telephony networks, such as analog voice networks or digital fiber communications networks, via storage area networks (SANs), such as Fibre Channel SANs, and/or via any other suitable type of network and/or protocol.

In some embodiments, the computer system 1000 includes one or more offload cards 1070A or 1070B (including one or more processors 1075, and possibly including the one or more network interfaces 1040) that are connected using the I/O interface 1030 (e.g., a bus implementing a version of the Peripheral Component Interconnect-Express (PCI-E) standard, or another interconnect such as a Quick-Path interconnect (QPI) or UltraPath interconnect (UPI)). For example, in some embodiments the computer system 1000 can act as a host electronic device (e.g., operating as part of a hardware virtualization service) that hosts compute resources such as compute instances, and the one or more offload cards 1070A or 1070B execute a virtualization manager that can manage compute instances that execute on the host electronic device. As an example, in some embodiments the offload card(s) 1070A or 1070B can perform compute instance management operations, such as pausing and/or un-pausing compute instances, launching and/or terminating compute instances, performing memory transfer/copying operations, etc. These management operations can, in some embodiments, be performed by the offload card(s) 1070A or 1070B in coordination with a hypervisor (e.g., upon a request from a hypervisor) that is executed by the other processors 1010A-1010N of the computer system 1000. However, in some embodiments the virtualization manager implemented by the offload card(s) 1070A or 1070B can accommodate requests from other entities (e.g., from compute instances themselves), and can not coordinate with (or service) any separate hypervisor.

In some embodiments, the system memory 1020 can be one embodiment of a computer-accessible medium configured to store program instructions and data as described above. However, in other embodiments, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computer system 1000 via the I/O interface 1030. A non-transitory computer-accessible storage medium can also include any volatile or non-volatile media such as RAM (e.g., SDRAM, double data rate (DDR) SDRAM, SRAM, etc.), read only memory (ROM), etc., that can be included in some embodiments of the computer system 1000 as the system memory 1020 or another type of memory. Further, a computer-accessible medium can include transmission media or signals such as electrical, electromagnetic, or digital signals, conveyed via a communication medium such as a network and/or a wireless link, such as can be implemented via the network interface 1040.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments use at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, PHP, or TCL, as well as combinations thereof. The server(s) can also include database servers, including without limitation those commercially available from Oracle (R), Microsoft (R), Sybase (R), IBM (R), etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments can be practiced without the specific details. Furthermore, well-known features can be omitted or simplified in order not to obscure the embodiment being described.

Bracketed text and blocks with dashed borders (e.g., large dashes, small dashes, dot-dash, and dots) are used herein to illustrate optional aspects that add additional features to some embodiments. However, such notation should not be taken to mean that these are the only options or optional operations, and/or that blocks with solid borders are not optional in certain embodiments.

Reference numerals with suffix letters (e.g., 918A-918N) can be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various embodiments.

References to "one embodiment," "an embodiment," "an example embodiment," etc., indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given embodiment requires at least one of A, at least one of B, and at least one of C to each be present.

As used herein, the term "based on" (or similar) is an open-ended term used to describe one or more factors that affect a determination or other action. It is to be understood that this term does not foreclose additional factors that may affect a determination or action. For example, a determination may be solely based on the factor(s) listed or based on the factor(s) and one or more additional factors. Thus, if an action A is "based on" B, it is to be understood that B is one factor that affects action A, but this does not foreclose the action from also being based on one or multiple other factors, such as factor C. However, in some instances, action A may be based entirely on B.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

Further, the words "may" or "can" are used in a permissive sense (i.e., meaning having the potential to), rather than the mandatory sense (i.e., meaning must). The words "include," "including," and "includes" are used to indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for the nouns that they precede, and do not imply any type of ordering (e.g., spatial, temporal, logical, etc.) unless such an ordering is otherwise explicitly indicated.

The specification and drawings are, accordingly, to be regarded in an illustrative rather than a restrictive sense. It will, however, be evident that various modifications and changes can be made thereunto without departing from the broader spirit and scope of the disclosure as set forth in the claims.

What is claimed is:

1. A computer-implemented method comprising:
   receive one or more requests to directly insert one or more data points into a cold tier of a time series database, wherein the time series database includes a first portion of data stored within a hot tier and a second portion of data stored in the cold tier in a column-oriented data format, wherein the first portion of data and the second portion of data belong to a same partition of the time series database;

inserting the one or more data points into a scratch space storage that is not part of the hot tier or the cold tier;

determining to merge the one or more data points into the cold tier;

downloading the second portion of data from a first storage location of the cold tier;

storing the second portion of data in one or more non-transitory computer-accessible storage media in a row-oriented format;

generating a third portion of data based on merging the second portion of data in the row-oriented format and the one or more data points of the scratch space storage;

storing the third portion of data, in column-oriented format, at a second storage location of the cold tier; and updating mapping metadata for the partition to remove a reference to the first storage location and to include a reference to the second storage location.

2. The computer-implemented method of claim 1, wherein the determining comprises:
determining that a threshold amount of time has passed since a prior addition of data points into the cold tier.

3. The computer-implemented method of claim 1, wherein the determining comprises:
determining that an amount of received data points to be added to the time series database over a recent period of time meets or exceeds a throughput threshold; or
determining that a size or amount of the second portion of data stored in a persistent storage in the cold tier meets or exceeds a size threshold.

4. A computer-implemented method comprising:
determining to add one or more data points directly into a cold tier of a time series database, wherein the time series database includes a first portion of data stored in a hot tier and a second portion of data stored in the cold tier, wherein the first portion of data and the second portion of data belong to a same partition of the time series database, wherein the second portion of data is stored in the cold tier in a read-optimized data format;
obtaining the second portion of data from a first storage location of the cold tier;
storing the second portion of data in one or more non-transitory computer-accessible storage media in a write-optimized data format;
generating a third portion of data based on merging the second portion of data in the write-optimized data format and the one or more data points;
storing, in a read-optimized data format, the third portion of data at a second storage location of the cold tier; and
updating mapping metadata for said same partition to remove a reference to the first storage location and to include a reference to the second storage location.

5. The computer-implemented method of claim 4, wherein the determining comprises:
determining that a threshold amount of time has passed since a prior addition of data points into the cold tier.

6. The computer-implemented method of claim 4, wherein the determining comprises:
determining that an amount of received data points to be added to the time series database over a recent period of time meets or exceeds a throughput threshold; or
determining that a size or amount of the second portion of data stored in a persistent storage in the cold tier meets or exceeds a size threshold.

7. The computer-implemented method of claim 4, further comprising:
prior to the determining, receiving one or more requests including the one or more data points, the one or more requests indicating that the one or more data points are to be merged directly into the cold tier without being placed in the hot tier.

8. The computer-implemented method of claim 7, further comprising:
inserting the one or more data points into a scratch space datastore that is not a part of the hot tier or the cold tier.

9. The computer-implemented method of claim 8, further comprising:
obtaining a snapshot of the scratch space datastore; and
inserting an additional one or more data points into the scratch space datastore that are to be merged into the cold tier,
wherein generating a third portion of data includes obtaining the one or more data points, but not the additional one or more data points, based on use of the snapshot.

10. The computer-implemented method of claim 9, further comprising:
at a point in time after the updating of the mapping metadata, merging at least the additional one or more data points into the cold tier.

11. The computer-implemented method of claim 4, further comprising:
receiving, after the determining and prior to the updating, an additional one or more data points to be merged into the cold tier;
inserting the additional one or more data points into a first scratch space datastore associated with a first partition object, wherein the first partition object is associated with the partition; and
inserting the additional one or more data points into a second scratch space datastore associated with a second partition object, wherein the second partition object is also associated with the partition.

12. The computer-implemented method of claim 4, further comprising:
generating a fourth portion of data based on use of both the second portion of data and the one or more data points;
writing the fourth portion of data to a third storage location of the cold tier; and
updating the mapping metadata to include a reference to the third storage location, wherein the third storage location is part of a new partition.

13. The computer-implemented method of claim 4, further comprising:
determining whether a partition split point is acceptable based at least in part on use of both the second portion of data and the one or more data points.

14. The computer-implemented method of claim 13, further comprising:
responsive to determining whether the partition split point is not acceptable, enqueuing or initiating a partition split to occur based on a split point identified during the determining.

15. The computer-implemented method of claim 4, wherein generating the third portion includes determining to reject a data point, from the one or more data points, from inclusion in the third portion based on an analysis of a version value associated with the data point and a corresponding version value associated with a corresponding data point from the second portion of data.

16. The computer-implemented method of claim 4, wherein the read-optimized data format comprises a column-oriented data format; and wherein the write-optimized data format comprises a row-oriented data format.

17. A system comprising:
   a first one or more electronic devices to implement a hot tier in a multi-tenant provider network for a time series database service to store a first portion of data of a first partition of a time series database;
   a second one or more electronic devices to implement a cold tier for the time series database service to store in a read-optimized data format a second portion of data of the first partition of the time series database; and
   a third one or more electronic devices to implement an ingestion layer for the time series database service, the ingestion layer including instructions that upon execution cause the ingestion layer to:
      determine to add one or more data points directly into the cold tier;
      obtain the second portion of data from a first storage location of the cold tier;
      store the second portion of data in one or more non-transitory computer-accessible storage media in a write-optimized data format;
      generate a third portion of data based on merging the second portion of data in the write-optimized data format and the one or more data points;
      store, in a read-optimized data format, the third portion of data at a second storage location of the cold tier; and
      update mapping metadata for the first partition to remove a reference to the first storage location and to include a reference to the second storage location.

18. The system of claim 17, wherein to determine to add the one or more data points the ingestion layer is to:
   determine that a threshold amount of time has passed since a prior addition of data points into the cold tier.

19. The system of claim 17, wherein to determine to add the one or more data points the ingestion layer is to:
   determine that an amount of received data points to be added to the time series database over a recent period of time meets or exceeds a throughput threshold; or
   determine that a size or amount of the second portion of data stored in a persistent storage in the cold tier meets or exceeds a size threshold.

20. The system of claim 17, the ingestion layer further including instructions that upon execution cause the ingestion layer to:
   prior to the determination, receive one or more requests including the one or more data points, the one or more requests indicating that the one or more data points are to be merged directly into the cold tier without being placed in the hot tier.

* * * * *